US008243983B2

(12) United States Patent
Lam

(10) Patent No.: US 8,243,983 B2
(45) Date of Patent: Aug. 14, 2012

(54) GRAPHICALLY ENCODED DATA COPY AND PASTE

(75) Inventor: Wilson H. Lam, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 572 days.

(21) Appl. No.: 12/541,488

(22) Filed: Aug. 14, 2009

(65) Prior Publication Data

US 2011/0038552 A1 Feb. 17, 2011

(51) Int. Cl.
G06K 9/00 (2006.01)
G06K 7/10 (2006.01)

(52) U.S. Cl. ........................ 382/100; 382/233; 235/462.1

(58) Field of Classification Search .................. 382/100, 382/112–116, 135–140, 155, 162, 168, 173, 382/181–194, 209, 219–220, 232–239, 254, 382/274, 276, 305, 312; 235/375, 494, 462.1; 386/252, 329; 715/778; 345/676
See application file for complete search history.

(56) References Cited

U.S. PATENT DOCUMENTS

| 5,442,739 A * | 8/1995 | Saito ............................. 345/676 |
| 6,169,847 B1 * | 1/2001 | Mizoguchi et al. ........... 386/329 |
| 6,370,318 B1 * | 4/2002 | Iwaki ............................. 386/252 |
| 6,512,919 B2 | 1/2003 | Ogasawara |
| 6,732,933 B2 | 5/2004 | Waxelbaum |
| 7,021,534 B1 | 4/2006 | Kiliccote |
| 7,543,748 B2 | 6/2009 | Kiliccote |
| 7,614,546 B2 * | 11/2009 | Grant et al. .................... 235/375 |
| 7,766,245 B2 * | 8/2010 | Pinchen et al. ............... 235/494 |
| 2001/0045461 A1 | 11/2001 | Schuessler |
| 2004/0065739 A1 * | 4/2004 | Xu et al. ..................... 235/462.1 |
| 2006/0136719 A1 * | 6/2006 | Doyle et al. .................. 713/157 |
| 2008/0307349 A1 * | 12/2008 | Wang et al. ................... 715/778 |
| 2009/0045260 A1 | 2/2009 | Blake et al. |

FOREIGN PATENT DOCUMENTS

WO 2008004007 A2 1/2008

OTHER PUBLICATIONS

"High Capacity Color Barcode", Retrieved at <<http://en.wikipedia.org/wiki/High_Capacity_Color_Barcode>>, Aug. 3, 2009, pp. 1-3.
"Microsoft Tag", Retrieved at <<http://www.microsoft.com/tag/content/faq/>>, Jul. 31, 2009, pp. 1-2.

* cited by examiner

*Primary Examiner* — Seyed Azarian
(74) *Attorney, Agent, or Firm* — Wolfe-SBMC

(57) ABSTRACT

In accordance with one or more aspects, at a first device both an indication of data to be copied and a request to perform graphical copying of the data is received. The data is graphically encoded to generate an image that is displayed by the first device. In a second device, a request to perform graphical pasting of data is received. The second device captures the image displayed by the first device and decodes data graphically encoded in the image. The decoded data is pasted to a location of the first device.

19 Claims, 7 Drawing Sheets

GRAPHICALLY ENCODED DATA COPY AND PASTE

BACKGROUND

As technology has advanced, computing devices have become increasingly present in people's lives. Given the widespread usage of such devices and the information they store, users oftentimes want to transfer data from one device to another device, whether it be another of their own devices or another user's device. Such transferring, however, oftentimes involves numerous steps to configure the devices to be able to communicate with one another wirelessly, and/or requires some wired connection or other exchange of a physical component (e.g., a memory card). These mechanisms for transferring data can be time consuming and cumbersome on the part of the user, reducing the user friendliness of the devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, both an indication of data to be copied and a request to perform graphical copying of the data are received. The data is graphically encoded to generate an image that is displayed.

In accordance with one or more aspects, in a first device a request to perform graphical pasting of data is received. An image displayed by a second device is captured and data graphically encoded in the image is decoded. The decoded data is pasted to a location of the first device

BRIEF DESCRIPTION OF THE DRAWINGS

The same numbers are used throughout the drawings to reference like features.

DETAILED DESCRIPTION

Graphically encoded data copy and paste is discussed herein. Data to be copied from one device (a source device) to another device (a recipient device) is graphically encoded by the source device. The graphically encoded data is then displayed on a screen of the source device. An image capture component of the recipient device captures the graphically encoded data displayed on the screen of the source device, and decodes the captured data. The recipient device pastes the decoded data into an appropriate location of the recipient device.

References are made herein to symmetric key cryptography, public key cryptography and public/private key pairs. Although such key cryptography is well-known to those skilled in the art, a brief overview of such cryptography is included here to assist the reader. In public key cryptography, an entity (such as a user, hardware or software component, a device, a domain, and so forth) has associated with it a public/private key pair. The public key can be made publicly available, but the entity keeps the private key a secret. Without the private key it is computationally very difficult to decrypt data that is encrypted using the public key. So, data can be encrypted by any entity with the public key and only decrypted by an entity with the corresponding private key. Additionally, a digital signature for data can be generated by using the data and the private key. Without the private key it is computationally very difficult to create a signature that can be verified using the public key. Any entity with the public key can use the public key to verify the digital signature by executing a suitable digital signature verification algorithm on the public key, the signature, and the data that was signed.

In symmetric key cryptography, on the other hand, a shared key (also referred to as a symmetric key) is known by and kept secret by the two entities. Any entity having the shared key is typically able to decrypt data encrypted with that shared key. Without the shared key it is computationally very difficult to decrypt data that is encrypted with the shared key. So, if two entities both know the shared key, each can encrypt data that can be decrypted by the other, but other entities cannot decrypt the data if the other entities do not know the shared key.

Figure 1:
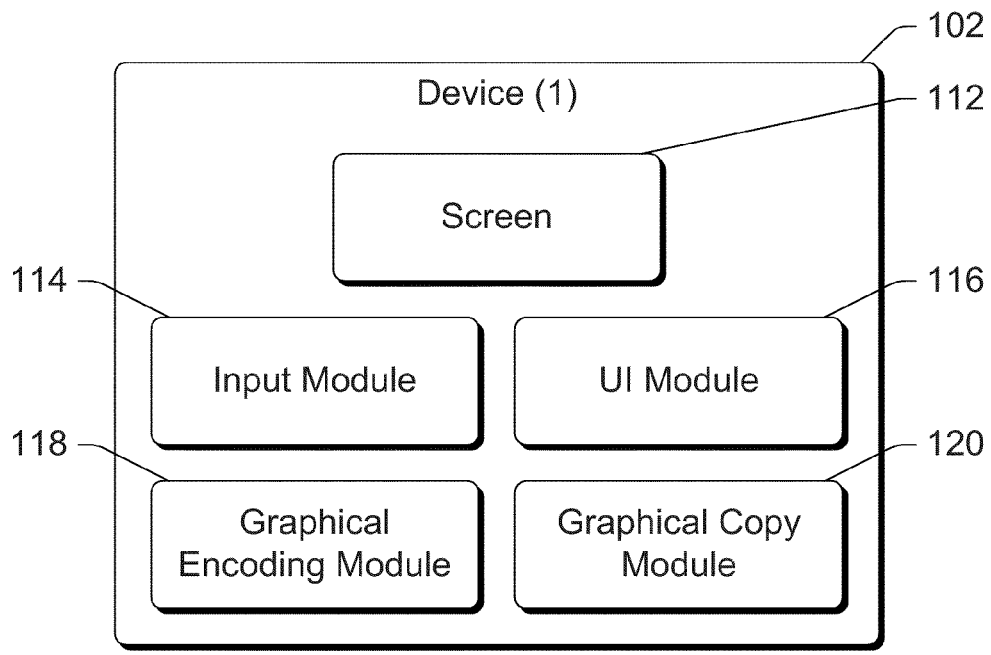
FIG. 1 illustrates an example system implementing the graphically encoded data copy and paste in accordance with one or more embodiments.
Figure 1:
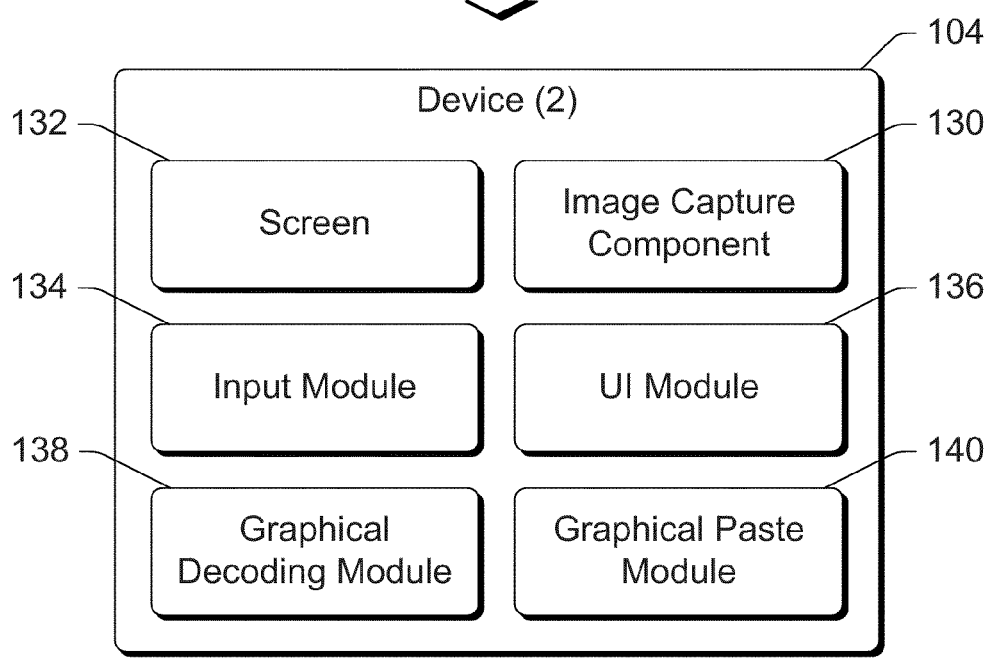

FIG. 1 illustrates an example system 100 implementing the graphically encoded data copy and paste in accordance with one or more embodiments. System 100 includes a device 102 and a device 104. Each of devices 102 and 104 can be a variety of different types of devices. For example, each of device 102 and device 104 can be a desktop computer, a netbook, a handheld computer, a personal digital assistant (PDA), a mobile station, an entertainment appliance, a set-top box communicatively coupled to a display device, a cellular or other wireless phone, a game console, an automotive computer, and so forth. Thus, each of devices 102 may range from a full resource device with substantial memory and processor resources (e.g., personal computers, game consoles) to a low-resource device with limited memory and/or processing resources (e.g., traditional set-top boxes, hand-held game consoles). Devices 102 and 104 can be the same type of device, or alternatively different types of devices.

Graphically encoded data 106 can be transferred from device 102 to device 104. Accordingly, device 102 can also be referred to as a source device, and device 104 can also be referred to as a recipient device. Graphically encoded data is data that has been encoded using one or more graphical encoding techniques, resulting in one or more images that can be graphically decoded to obtain the encoded data. Although system 100 is discussed with reference to device 102 including modules supporting graphical copying of data, and device 104 including modules supporting graphical pasting of data, it is to be appreciated that device 104 can also include modules supporting graphical copying of data, and/or device 102 can also include modules supporting graphical pasting of data.

It is to be appreciated that the graphical copying and pasting of data discussed herein refers to one device generating one or more images by graphically encoding data to be copied, and another device graphically obtaining the data being copied by decoding those one or more images. The image itself is not the data that is being copied and pasted. Rather, the data encoded in the image is the data that is being copied and pasted.

Although not illustrated in FIG. 1, devices 102 and 104 can also include various additional modules or components, including one or more applications that are run by one or more processors of device 102 or 104. A variety of different types of modules or applications can be included in a device 102 or 104, such as communications applications or modules for wirelessly sending data to and/or receiving data from other devices, productivity applications or modules (e.g., spreadsheets, word processors), recreational applications or modules (e.g., games), resource applications or modules (e.g., databases, digital books), audio/video applications or modules (e.g., digital cameras, digital video cameras, music playback programs), mapping or tracking applications or modules, and so forth.

In the discussions herein, when transferring data from a source device to a recipient device (e.g., from device 102 to 104), the data can remain at the source device after being transferred. Accordingly, after the copying and pasting of particular data, copies of that particular data are present on both the source device and the recipient device. Alternatively, the data can be deleted or otherwise removed from the source device (which is also referred to as cutting). Accordingly, after such copying and pasting of particular data, the particular data is present on the recipient device but is no longer present on the source device. The copying of data discussed herein includes embodiments in which the data remains at the source device after being transferred to the recipient device, as well as embodiments in which the data is deleted or is otherwise no longer present on the source device after being transferred to the recipient device.

Device 102 includes a screen 112, an input module 114, a user interface (UI) module 116, a graphical encoding module 118, and a graphical copy module 120. Each of modules 114, 116, 118, and 120 can be implemented in software, firmware, hardware, or combinations thereof. When implemented in software or firmware, such a module includes one or more instructions that are executed by one or more processors or controllers of device 102.

Screen 112 is a display component of device 102. Screen 112 can be implemented in a variety of different manners, such as using liquid crystal display (LCD) technology, plasma screen technology, image projection technology, and so forth. Alternatively, rather than including screen 112, screen 112 can be separate from device 102 and device 102 can generate one or more signals that are output to one or more other display devices which include screen 112.

Input module 114 receives user inputs from a user of device 102. User inputs can be provided in a variety of different manners, such as by pressing a particular portion of a touchpad or touchscreen of device 102, by entering one or more gestures (e.g., particular shapes or patterns) on a touchpad or touchscreen of device 102, or pressing one or more keys of a keypad or keyboard of device 102. Touchscreen functionality can be provided using a variety of different technologies, such as through capacitive, surface acoustic wave, resistive, optical, strain gauge, dispersive signals, acoustic pulse, or other touchscreen technologies. The user input can also be provided in other manners, such as via audible inputs, other physical feedback input to the device (e.g., tapping any portion of device 102 or another action that can be recognized by a motion detection component of device 102, such as shaking device 102, rotating device 102, etc.), and so forth.

UI module 116 generates, manages, and/or outputs a user interface for display on screen 112. This user interface displays various information on screen 112, and user inputs can be received by input module 114 as discussed above. UI module 116 can display, for example, images generated by applications or modules of device 102, messages sent by device 102 to other devices, messages received by device 102 from other devices, and so forth.

Graphical encoding module 118 graphically encodes data to be copied from device 102 to device 104. Module 118 can graphically encode data using a variety of different graphical encoding techniques. In one or more embodiments, module 118 generates a barcode, such as a high capacity color barcode (HCCB), a QR barcode, other one-dimensional or multi-dimensional barcodes, and so forth. Alternatively, module 118 can graphically encode data using a variety of other techniques that result in an image that can be graphically decoded to obtain the data encoded in the image.

Graphical copy module 120 manages the graphical copying of data from device 102. The particular data from device 102 to be copied can be identified by module 120 in a variety of different manners. In one or more embodiments, a user provides inputs via input module 114 that select particular data to be copied, such as a particular string of characters. Alternatively, a user can provide inputs via input module 114 that select a particular file that is the data to be copied. Alternatively, another component or module of device 102 can provide an indication to module 120 of particular data that is to be copied.

Graphical copy module 120 identifies the data to be copied and provides the data to graphical encoding module 118. Graphical encoding module 118, in turn, graphically encodes the data to generate one or more images. These images are a graphical encoding of the data being copied to device 104, and are displayed on screen 112. The display of these images on screen 112 can be managed by UI module 116, graphical encoding module 118, graphical copy module 120, or alternatively another module of device 102. These images displayed on screen 112 are the graphically encoded data 106 being copied to device 104.

Figure 2:
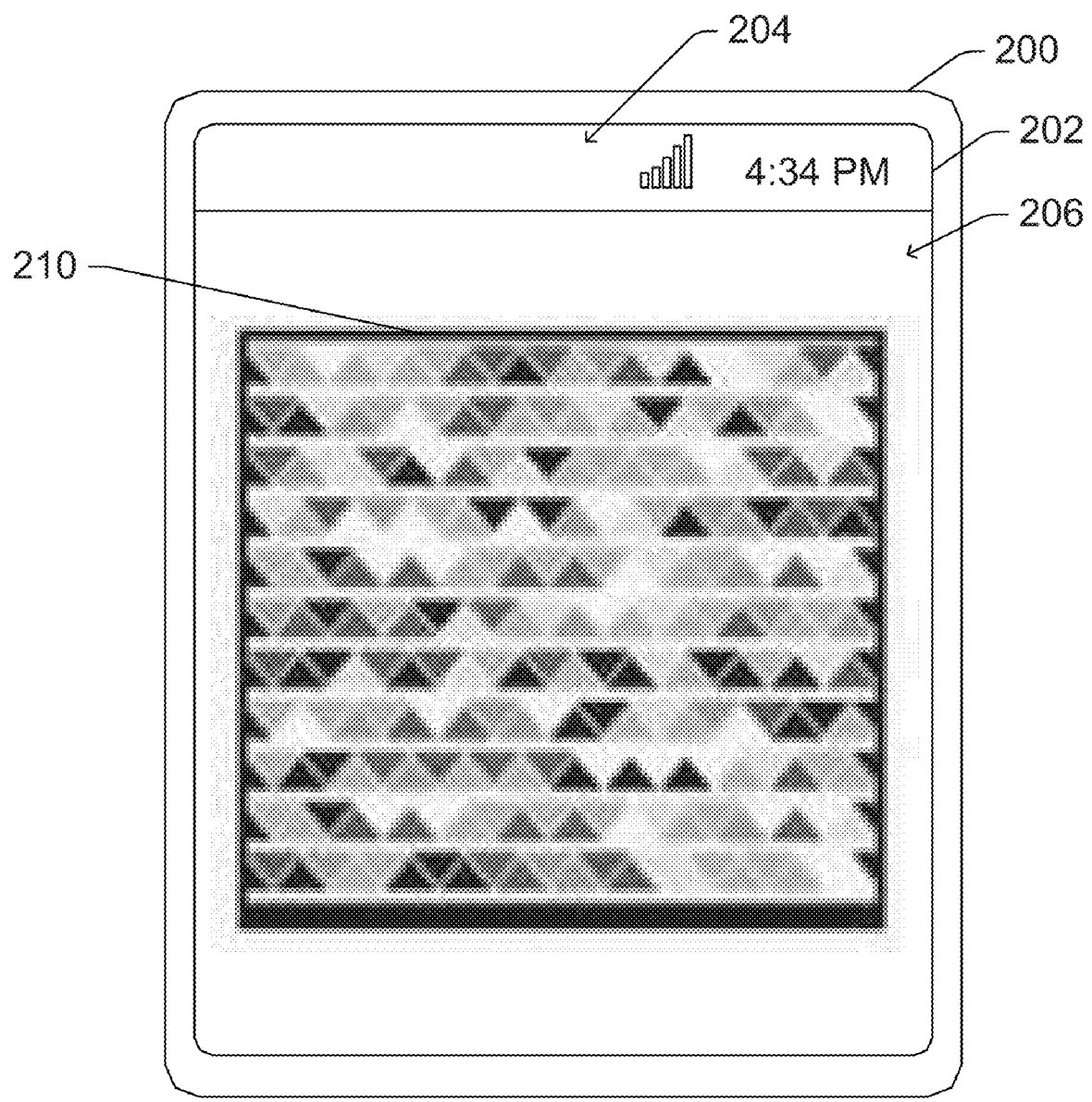
FIG. 2 is a diagram illustrating an example screen display of a device in accordance with one or more embodiments.

FIG. 2 is a diagram illustrating an example screen display of a device 200 in accordance with one or more embodiments. In FIG. 2, a screen 202 is displayed having a header portion 204 and an application portion 206. Images generated by an application or module running on the device are displayed in application portion 206, while information describing those applications or modules, and/or describing the operation of the device, is displayed in header portion 204. For example, header portion 204 can include one or more vertical bars indicating the strength of a wireless signal being received by the device and a current time. It is to be appreciated, however, that different and/or additional information can be displayed in header portion 204.

An image 210 is included in application portion 206. Image 210 is graphically encoded data that has been copied by device 200. Although illustrated as a non-colorized image, it is to be appreciated that image 210 can include various colors (e.g., as an HCCB image).

Returning to FIG. 1, device 104 includes a screen 132, an image capture component 130, an input module 134, a UI module 136, a graphical decoding module 138, and a graphical paste module 140. Each of modules 134, 136, 138, and 140 can be implemented in software, firmware, hardware, or combinations thereof. Screen 132 is a display component of device 104 (or a separate display device), analogous to screen 112 of device 102. Input module 134 receives inputs from a user of device 104, analogous to input module 114 of device 102. UI module 136 generates, manages, and/or outputs a user interface for display on screen 114, analogous to UI module 116 of device 102.

Image capture component 130 captures images for use by device 104. Image capture component 130 can also be referred to as a camera or digital camera. A variety of different technologies can be used to implement image capture component 130, such as CCD (charge coupled device) technology, CMOS (complementary metal oxide semiconductor) technology, and so forth.

Graphical decoding module 138 graphically decodes data copied from device 102. Module 138 can graphically decode data using a variety of different graphical decoding techniques. The particular technique used by module 138 depends on the particular graphical encoding technique used by graphical encoding module 118 of device 102 to encode the data. In one or more embodiments, graphical encoding module 118 and graphical decoding module 138 are configured with or otherwise aware of the particular graphical encoding technique being used, and module 138 can thus readily decode data encoded by module 118. Alternatively, graphical decoding module 138 can automatically detect the particular graphical encoding technique being used in a variety of different manners. For example, module 138 can determine the graphical encoding technique being used based on characteristics of the image (e.g., whether the image is black and white or includes color, whether symbols in the image are triangles or other shapes, etc.) in which the data is encoded.

By way of another example, module 138 can determine the graphical encoding technique being used based on an identifier encoded in the image (e.g., a particular portion of the image that decodes to a particular value for a particular graphical encoding technique). Module 138 can decode the image assuming the image was encoded using one graphical encoding technique and check whether the particular portion decodes to the particular value—if the particular portion decodes to the particular value then module 138 knows that one graphical encoding technique was used to encode the image, otherwise module 138 can repeatedly select different graphical encoding techniques until the particular portion decodes to the particular value.

Graphical paste module 120 manages the graphical pasting of data copied from device 102. The images displayed on screen 112 as graphically encoded data 106 are captured by image capture component 130 and provided to graphical decoding module 138. Graphical decoding module 138 decodes the data encoded in the images and provides the decoded data to graphical paste module 140.

Graphical paste module 140 pastes or otherwise stores the decoded data to a particular location of device 104. In one or more embodiments this particular location is a location of an application or module running on computing device 104 (e.g., a data entry field of the application or module). Alternatively, this particular location can be a particular location in a file system or other location of device 104. In one or more embodiments, a user provides inputs via input module 134 that identify a particular location of device 104 where the data is to be pasted. Alternatively, another component or module of device 104 can provide an indication to module 140 of a location where the data is to be pasted, or the location can be identified in graphically encoded data 106.

Image capture component 130 can determine when to capture an image displayed by device 102 on screen 112 in a variety of different manners. In one or more embodiments, the image is captured by component 130 in response to a capture request input by a user via input module 134, such as by selecting a "capture" button or menu item, tapping device 104, and so forth. This allows the user of device 104 to position device 104 appropriately so that screen 112 is in view of a lens or other opening of device 104, allowing component 130 to capture the image displayed on screen 112. For example, device 104 can switch to a camera mode in response to a user request (e.g., a user request to paste graphically encoded data as discussed in more detail below), displaying on screen 132 a view being seen by image capture component 130. The user can then position device 104 appropriately so that the image on screen 112 is being seen by image capture component 130, and then input a capture request.

Alternatively, the user of device 104 can enter a request to paste data encoded in an image, in response to which component 130 begins capturing images at regular or irregular intervals until one or more images that graphically encode data are captured. Device 104 can distinguish images that graphically encode data from images that do not graphically encode data in different manners, such as based on a known signature or other value encoded into each graphically encoded image by module 118.

Accordingly, data can be identified for copying at device 102, graphically encoded, and displayed as one or more images on screen 112. These one or more images are captured by device 104, decoded, and the decoded data pasted to an appropriate location of device 104. Thus, data can be easily transferred from one device to another, and cumbersome processes for configuring devices to communicate with one another can be avoided.

Various functionality is discussed herein as being performed by particular devices 102 and 104. It is to be appreciated, however, that at least part of this functionality can be performed by another device or service rather than being performed by the particular device 102 and 104. For example, rather than device 102 graphically encoding data, device 102 can communicate the data to another device or service that graphically encodes the data and returns the graphically encoded data to device 102.

Figure 3:
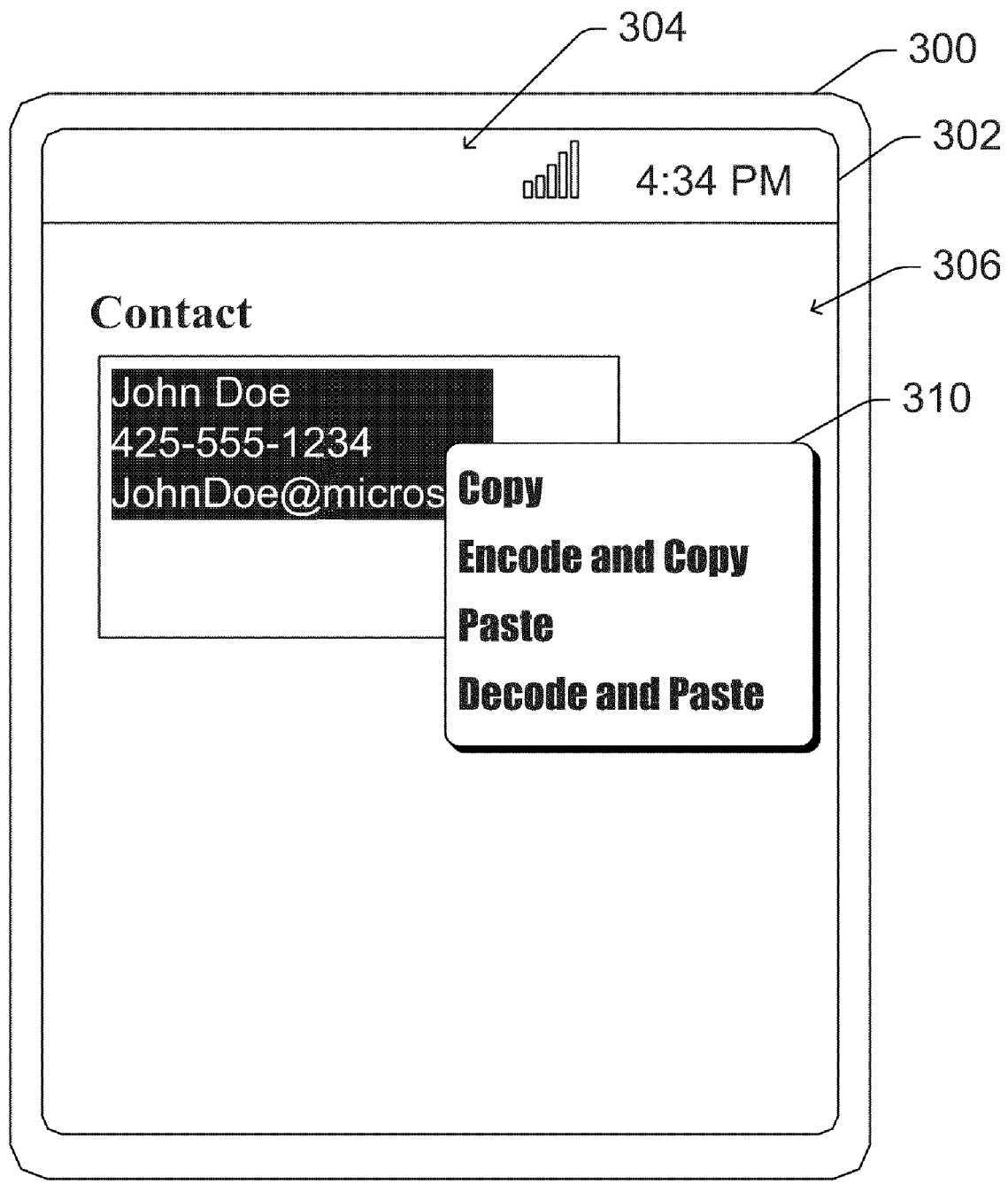
FIG. 3 is a diagram illustrating an example screen display supporting graphically encoding and copying data in accordance with one or more embodiments.

FIG. 3 is a diagram illustrating an example screen display supporting graphically encoding and copying data in accordance with one or more embodiments. In FIG. 3, a device 300 is displayed, which can be, for example, device 102 of FIG. 1. Device 300 includes a screen 302 displaying a header portion 304 and an application portion 306, analogous to header portion 204 and application portion 206 of FIG. 2, respectively. In application portion 306, example data is illustrated in the form of contact data. The contact data includes a name, telephone number, and email address of a particular contact.

In one or more embodiments, a user of device 300 can select the contact information (or portion thereof) displayed in application portion 306. The contact information can be selected by a user in a variety of different manners, such as dragging his or her finger over the data being selected, touching a part of application portion 306 (e.g., touching the "contact" text), double-tapping on a part of application portion 306 (e.g., within the box displaying the contact information), and so forth. After being selected by the user, the selected portion is typically highlighted as illustrated in FIG. 3.

A context menu 310 is also illustrated in FIG. 3. Context menu 310 is typically displayed in response to a user request to display the context menu after data has been selected. The user request to display the context menu can be received as a variety of different inputs via input module 114. For example, the user request to display the context menu can be selection of a "menu" button, right-clicking on a cursor control device, entering a particular gesture, and so forth.

Context menu 310 includes a copy menu item, an encode and copy menu item, a paste menu item, and a decode and paste menu item. The user can select menu items from context menu 310 in a variety of different manners, such as by touching a displayed menu item with his or her finger, navigating the menu items using directional buttons and pressing a "select" or "ok" button when the menu item is highlighted, entering a particular gesture, and so forth.

Selection of the copy menu item causes the selected data to be copied to a clipboard, while selection of the paste menu item causes data from a clipboard to be pasted to the identified location (e.g., replacing the selected text). Selection of the encode and copy menu item causes the selected data to be copied, graphically encoded, and displayed as an image on screen 302 (e.g., as illustrated in FIG. 2 above). Selection of the decode and paste menu item causes images to be graphically decoded and pasted, as discussed in more detail below.

Figure 4:
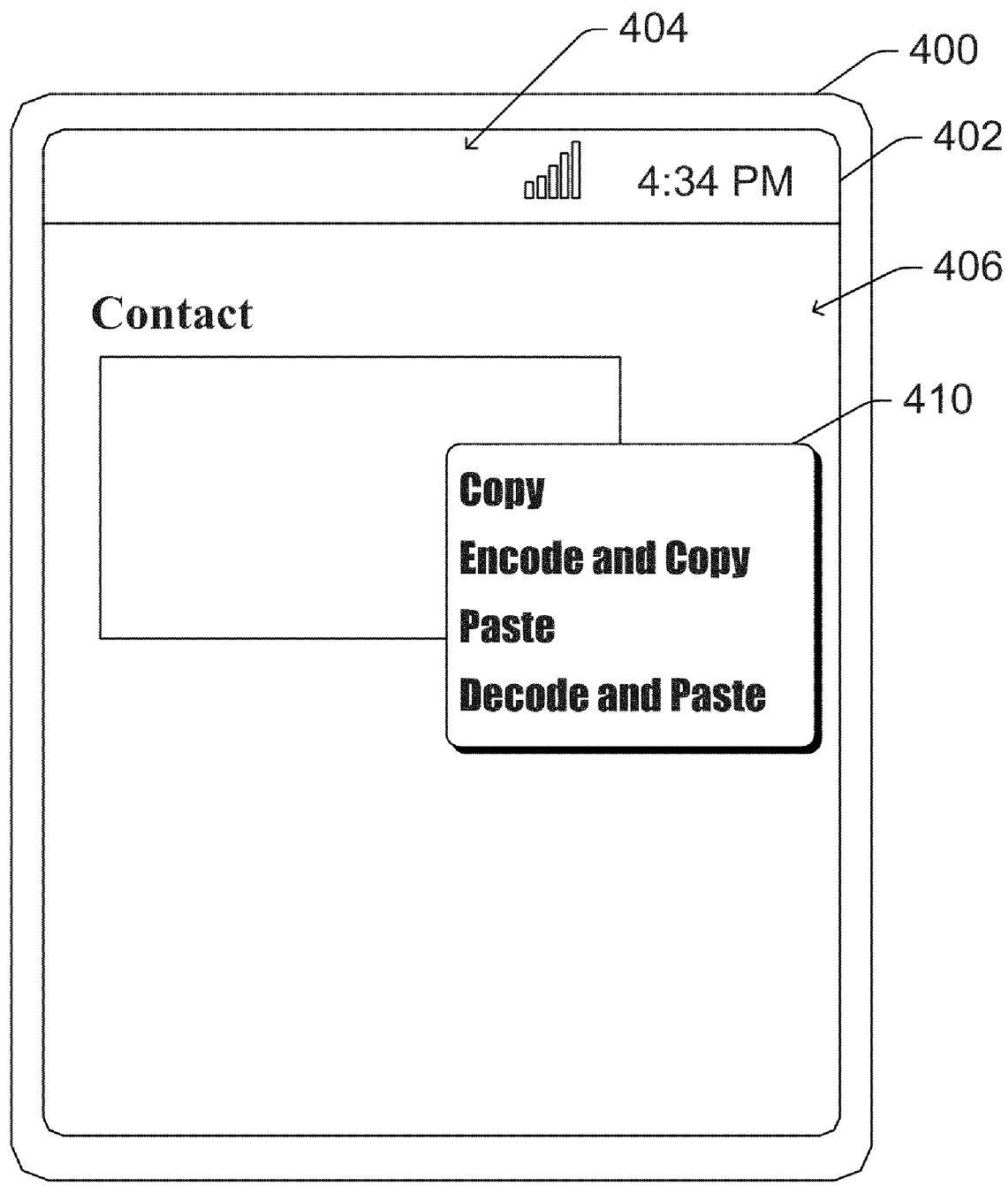
FIG. 4 is a diagram illustrating an example screen display supporting graphically decoding and pasting data in accordance with one or more embodiments.

FIG. 4 is a diagram illustrating an example screen display supporting graphically decoding and pasting data in accordance with one or more embodiments. In FIG. 4, a device 400 is displayed, which can be, for example, device 104 of FIG. 1. Device 400 includes a screen 402 displaying a header portion 404 and an application portion 406, analogous to header portion 204 and application portion 206 of FIG. 2, respectively. In application portion 406, a blank contact data field is illustrated.

A context menu 410 is also illustrated in FIG. 4, analogous to context menu 310 of FIG. 3. Context menu 410 is typically displayed in response to a user request to display the context menu, such as user selection of a "menu" button, right-clicking on a cursor control device, entering a particular gesture, and so forth. The user can select menu items from context menu 410 in a variety of different manners, such as by touching a displayed menu item with his or her finger, navigating the menu items using directional buttons and pressing a "select" or "ok" button when the menu item is highlighted, entering a particular gesture, and so forth.

The user can select the decode and paste menu item from context menu 410 to have graphically encoded data decoded and pasted to a location of device 400. The location where the data is pasted can be identified before the user selects the decode and paste menu item, such as being a location (e.g., current cursor location, most-recently touched location in application portion 406, etc.) identified when the user request to display the context menu is received. Alternatively, the location where the data is pasted can be identified (e.g., by the user) after the user selects the decode and paste menu item. For example, the data can be pasted to a clipboard or other storage location, and subsequently transferred to a location identified (e.g., by the user).

In response to selection of the decode and paste menu item, device 400 captures the image displayed on a screen of another device, graphically decodes the image, and pastes the decoded data to the selected location (e.g., in the empty contact box in application portion 406).

Returning to FIG. 1, situations can arise where the amount of data to be graphically encoded by module 118 exceeds the amount of data that can be encoded in a single image. In such situations, the data is encoded across multiple images. Device 102 (e.g., module 120 or 118) separates the data to be encoded into multiple portions, and graphically encodes the different portions to generate multiple images. The images are then displayed individually on screen 112. Component 130 of device 104 captures the multiple images, decodes each image, and then re-assembles the data.

The proper sequence of the multiple images can be encoded in one or more of the images so that the data can be re-assembled in the proper order. By encoding the proper sequence in one or more of the images, the images need not be displayed by device 102 and captured by device 104 in any particular order. Alternatively, no indication of the proper sequence may be encoded in the images; rather, device 104 relies on the images being displayed by device 102 in the proper order so that the data can be properly re-assembled.

In one or more embodiments, each of the multiple images has encoded in it an indication of which portion that image is (e.g., the first portion, the second portion, the third portion, etc.). In other embodiments, one or more of the multiple images has encoded in it an indication of the sequence of the images. For example, a single image can have a listing of the ordering of the images, with the different images being identified in the listing with identifiers that are encoded in each of the multiple images, with signatures of the images, with particular portions of the images that allow the different images to be distinguished from one another, and so forth. In other embodiments, an indication of the sequence of images can be encoded as an individual image rather than being encoded with a portion of the data being copied.

Device 102 can display the multiple images in different manners. For example, device 102 can display each of the multiple images for an amount of time, then automatically switch to displaying a next one of the multiple images, continuing until all of the multiple images have been displayed. The multiple images can each be displayed once, or alternatively can be cycled through and displayed multiple times. By way of another example, device 102 can display an image until a user request is received via input module 114 to display another of the multiple images. The user request is input, for example, after the image has been captured by device 104.

Device 104 can similarly capture the multiple images in different manners. For example, device 104 can automatically capture images as they are displayed on screen 112, or alternatively capture images in response to a user request to capture an image input via input module 134.

Additionally, it should be noted that various metadata can also be encoded in graphically encoded data 106. The metadata can be included in a header portion of the graphically encoded data, or another portion of the graphically encoded data known to both graphical encoding module 118 and graphical decoding module 138. This metadata can include, for example, sequencing information for multiple images across which the data is encoded as discussed above. Other metadata can also be included. For example, a type of data that is being copied to device 104 can be identified in the metadata, such as indicating that the data is text or characters, a file, an image, audio data, and so forth. Graphical paste module 140 can use this indication of the type of data to determine (or assist in determining) an appropriate location for pasting the data. For example, if the type of data is an audio data file, then module 140 can automatically paste the file to a music folder or directory without receiving user input indicating the location to paste the file.

Additionally, in one or more embodiments the data being copied is encrypted. The data is encrypted by device 102 using an encryption key, and the encrypted data is graphically encoded by graphical encoding module 118. Once received, device 104 decodes the graphically encoded encrypted data, then uses a decryption key to decrypt the data.

Encrypting and decrypting data can be performed in a variety of different manners. For example, symmetric key cryptography can be used, where the encryption key and decryption key are the same key (a symmetric key), and both device 102 and device 104 are aware of the key. The key can be made available to devices 102 and 104 in a variety of different manners, such as the user of one of devices 102 and 104 verbally telling the user of the other of devices 102 and 104 what the key is (or what a pass code or phrase is from which the devices can generation the encryption key).

By way of another example, public key cryptography can be used, where device 102 is aware of the public key of device 104. Device 102 can encrypt the data using the public key of device 104, and device 104 can decrypt the encrypted data using the private key of device 104.

Figure 5:
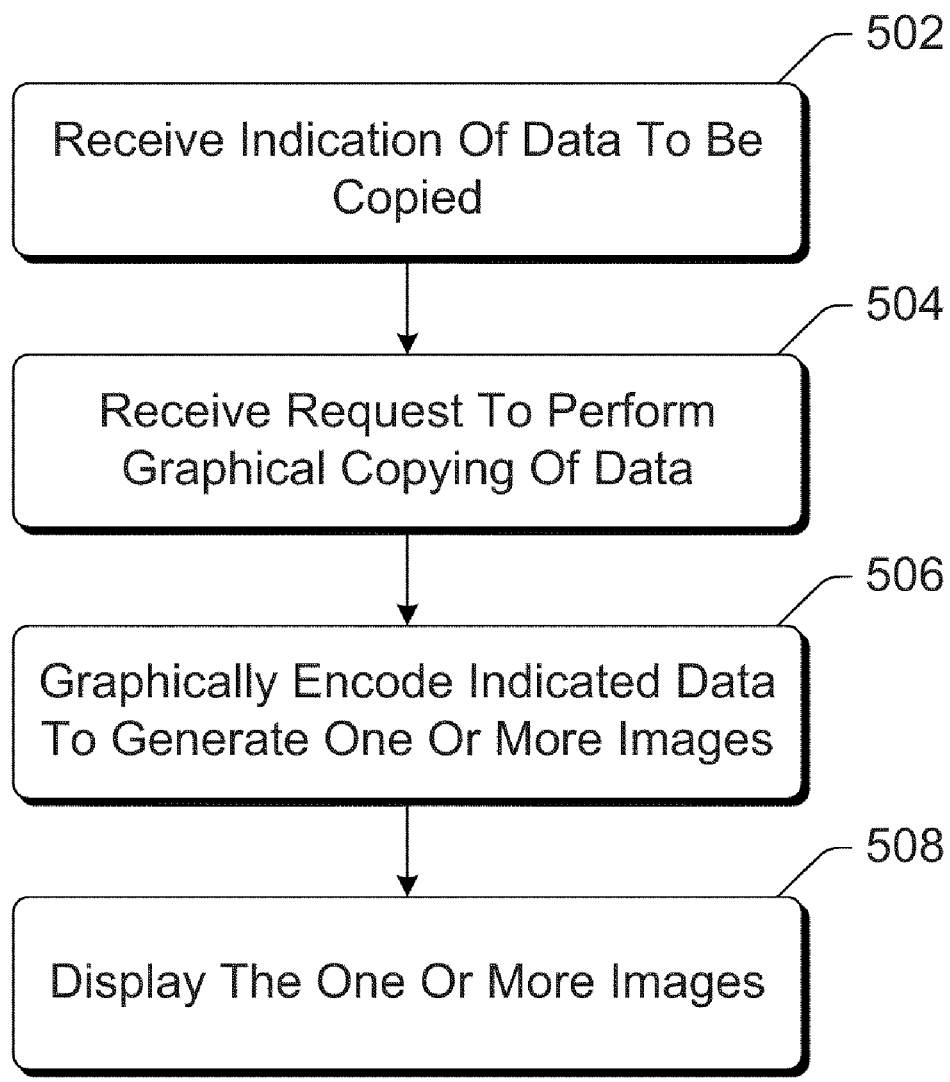
FIG. 5 is a flowchart illustrating an example process for a device graphically encoding and copying data in accordance with one or more embodiments.

FIG. 5 is a flowchart illustrating an example process 500 for a device graphically encoding and copying data in accordance with one or more embodiments. Process 500 is carried out by a device, such as device 102 of FIG. 1, and can be implemented in software, firmware, hardware, or combinations thereof. Process 500 is an example process for graphically encoding and copying data; additional discussions of graphically encoding and copying data are included herein with reference to different figures.

In process 500, an indication of data to be copied is received (act 502). This indication can be user selection of particular data as discussed above, such as particular data in a data field, a particular file, and so forth. This indication can alternatively be an indication of data received from another component or module.

A request to perform graphical copying of the data is received (act 504). This request can be, for example, a user request as discussed above, or alternatively can be a request received from another component or module.

The data indicated in act 502 is graphically encoded to generate one or more images (act 506). Depending on the amount of data, the graphical encoding technique being used, and/or the desires of the device implementing process 500, the data can be encoded in a single image or alternatively across multiple images.

The one or more images generated in act 506 are displayed (act 508). As discussed above, these images can be displayed on a screen of the device implementing process 500, or alternatively on a screen of a display device receiving signals from the device implementing process 500.

It should be noted that the acts in process 500 need not be performed in the order shown. For example, the indication of data to be copied can be received and then the request to perform graphical copying of the data received, and in response to the request the data can be graphically encoded. Alternatively, a request to perform graphical copying of data can be received, and then an indication of the data to be copied can be received.

Figure 6:
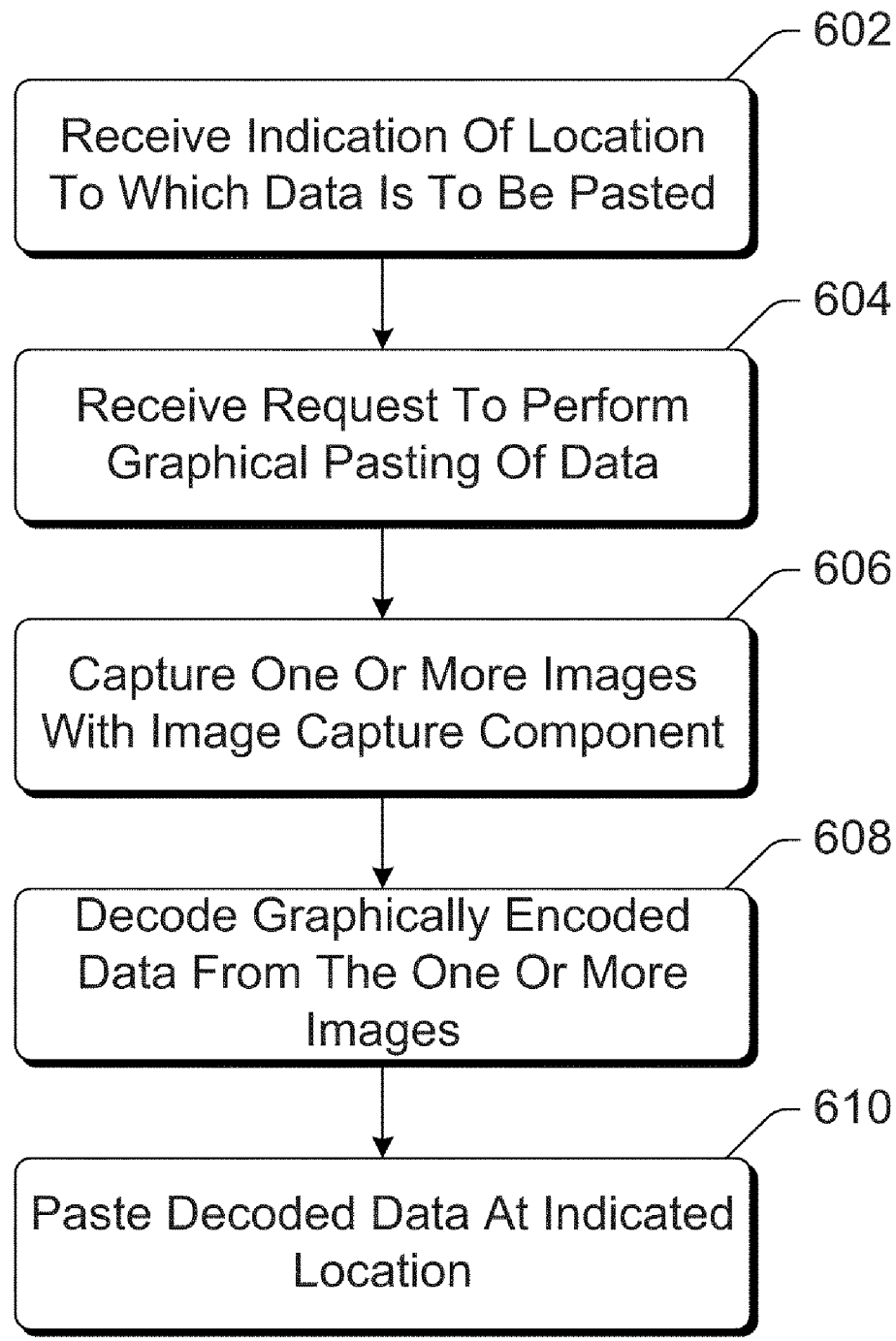
FIG. 6 is a flowchart illustrating an example process for a device graphically decoding and pasting data in accordance with one or more embodiments.

FIG. 6 is a flowchart illustrating an example process 600 for a device graphically decoding and pasting data in accordance with one or more embodiments. Process 600 is carried out by a device, such as device 104 of FIG. 1, and can be implemented in software, firmware, hardware, or combinations thereof. Process 600 is an example process for graphically decoding and pasting data; additional discussions of graphically decoding and pasting data are included herein with reference to different figures.

In process 600, an indication of a location to which data is to be pasted is received (act 602). This indication can be received from a user as discussed above, or alternatively can be received from another component or module. This indication can also be encoded in the images captured by the device implementing process 600.

A request to perform graphical pasting of data is received (act 604). This request can be, for example, a user request as discussed above, or alternatively can be a request received from another component or module.

One or more images are captured with an image capture component of the device implementing process 600 (act 606). These images are the images displayed by the device from which the data is being copied, as discussed above.

The graphically encoded data from the one or more images is decoded (act 608). The decoded data is pasted at the location indicated in act 602 (act 610), as discussed above.

It should be noted that the acts in process 600 need not be performed in the order shown. For example, the indication of the location to which data is to be pasted can be received and then the request to perform graphical pasting of the data received, and in response to the request the data can be captured, graphically decoded, and pasted to the indicated location. Alternatively, a request to perform graphical pasting of data can be received, and then an indication of the location to which the data is to be pasted can be received. For example, the data can be pasted to a clipboard or other storage location, and subsequently transferred to a location identified (e.g., a location identified by the user).

Figure 7:
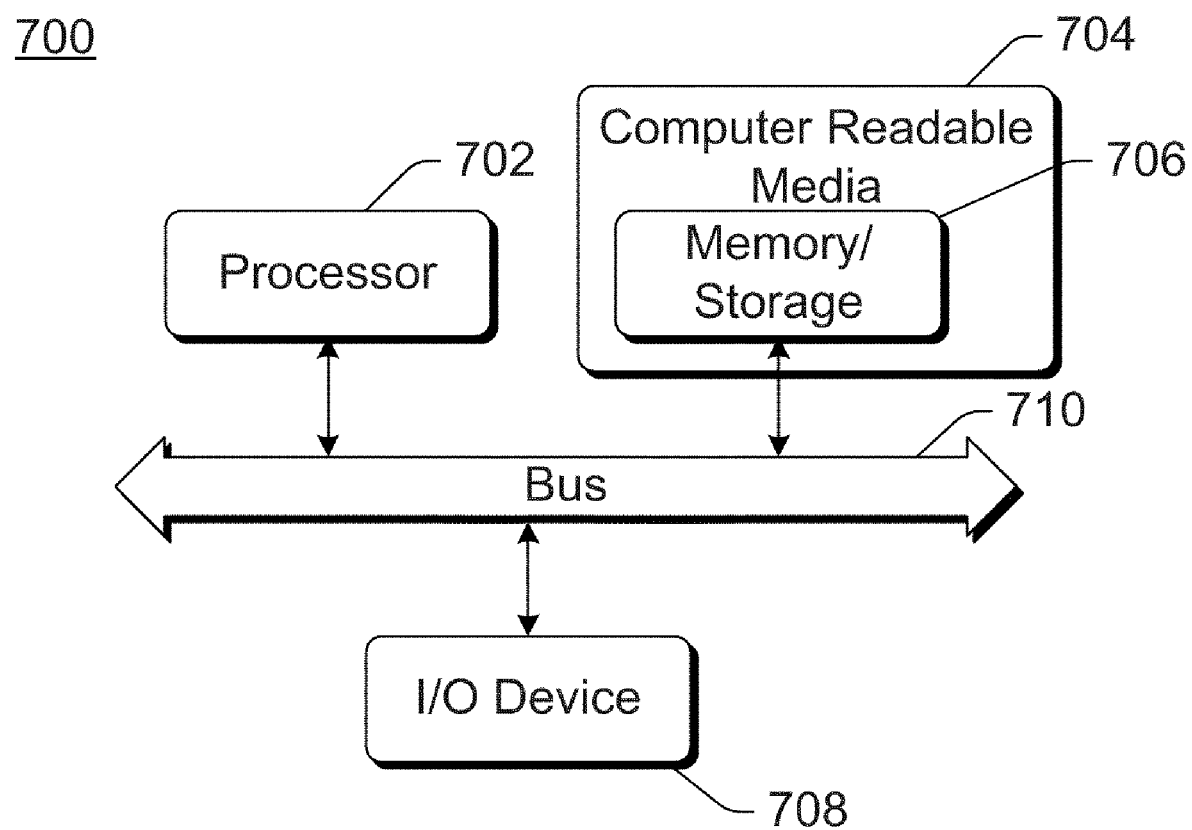
FIG. 7 illustrates an example computing device that can be configured to implement the graphically encoded data copy and paste in accordance with one or more embodiments.

FIG. 7 illustrates an example computing device 700 that can be configured to implement the graphically encoded data copy and paste in accordance with one or more embodiments. Computing device 700 can be, for example, device 102 or device 104 of FIG. 1.

Computing device 700 includes one or more processors or processing units 702, one or more computer readable media 704 which can include one or more memory and/or storage components 706, one or more input/output (I/O) devices 708, and a bus 710 that allows the various components and devices to communicate with one another. Computer readable media 704 and/or one or more I/O devices 708 can be included as part of, or alternatively may be coupled to, computing device 700. Bus 710 represents one or more of several types of bus structures, including a memory bus or memory controller, a peripheral bus, an accelerated graphics port, a processor or local bus, and so forth using a variety of different bus architectures. Bus 710 can include wired and/or wireless buses.

Memory/storage component 706 represents one or more computer storage media. Component 706 can include volatile media (such as random access memory (RAM)) and/or non-volatile media (such as read only memory (ROM), Flash memory, optical disks, magnetic disks, and so forth). Component 706 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 702. It is to be appreciated that different instructions can be stored in different components of computing device 700, such as in a processing unit 702, in various cache memories of a processing unit 702, in other cache memories of device 700 (not shown), on other computer readable media, and so forth. Additionally, it is to be appreciated that the location where instructions are stored in computing device 700 can change over time.

One or more input/output devices 708 allow a user to enter commands and information to computing device 700, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 7. The features of the graphically encoded data copy and paste techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a computing device, the method comprising:
   receiving an indication of data to be copied;
   receiving a request to perform graphical copying of the data, the receiving the request comprising receiving a user selection of an encode and copy menu item;
   graphically encoding the data to generate an image; and
   displaying the image.

2. A method as recited in claim 1, wherein receiving the indication comprises receiving a user selection of the data.

3. A method as recited in claim 1, further comprising graphically encoding the data to generate the image and displaying the image in response to the request.

4. A method as recited in claim 1, wherein graphically encoding the data comprises graphically encoding the data across multiple images, and displaying the graphically encoded data comprises displaying the multiple images individually.

5. A method as recited in claim 4, further comprising receiving a user request to change images being displayed, and changing which of the multiple images is displayed in response to the user request.

6. A method as recited in claim 4, further comprising including, in one or more of the multiple images, an indication of an order in which the multiple images are to be graphically decoded.

7. A method as recited in claim 1, wherein graphically encoding the data comprises graphically encoding both the data and an indication of one of multiple different data types that the data is.

8. A method as recited in claim 1, further comprising encrypting the data prior to graphically encoding the data.

9. A method as recited in claim 1, wherein graphically encoding the data comprises graphically encoding the data using a high capacity color barcode.

10. One or more computer storage media having stored thereon instructions that, when executed by one or more processors of a first device, cause the one or more processors to:
    receive a request to perform graphical pasting of data;
    capture an image displayed by a second device;
    decode data graphically encoded in the image; and
    paste the data to a location of the first device.

11. One or more computer storage media as recited in claim 10, the instructions further causing the one or more processors to receive a user indication of a location of an application running on the first device, and wherein to paste the data is to paste the data to the location of the application.

12. One or more computer storage media as recited in claim 10, the instructions further causing the one or more processors to decode and paste the data in response to the request.

13. One or more computer storage media as recited in claim 10, wherein to receive the request is to receive a user selection of a decode and paste menu item.

14. One or more computer storage media as recited in claim 10, wherein the data is encoded across multiple images, and wherein to capture the image is to capture the multiple images, and wherein to decode the data is to graphically decode the data from across the multiple images.

15. One or more computer storage media as recited in claim 14, wherein to decode the data from across the multiple images is to identify an order of the multiple images based on an indication of the order encoded in one or more of the multiple images, and re-assemble the data from across the multiple images in the order.

16. One or more computer storage media as recited in claim 10, wherein to decode the data is to graphically decode both the data and an indication of one of multiple different data types that the data is.

17. One or more computer storage media as recited in claim 10, wherein the instructions further cause the one or more processors to decrypt the data after decoding the data.

18. One or more computer storage media as recited in claim 10, wherein the data is graphically encoded using a high capacity color barcode.

19. A method implemented in a first device, the method comprising:
- receiving an indication of first data to be copied;
- receiving a first request to perform graphical copying of the data;
- in response to the first request,
    - graphically encoding the first data to generate a first image, and
    - displaying the first image;
- receiving a second request to perform graphical pasting of data; and
- in response to the second request,
    - capturing a second image displayed by a second device,
    - decoding second data graphically encoded in the second image, and
    - pasting the second data to a location of an application running on the first device.

* * * * *